(12) United States Patent
Wright et al.

(10) Patent No.: US 8,520,355 B2
(45) Date of Patent: Aug. 27, 2013

(54) METHODS AND SYSTEMS FOR TRANSIENT VOLTAGE PROTECTION

(75) Inventors: Kamron Wright, Fort Wayne, IN (US); Philip W. Johnson, Bluffton, IN (US); Donn Steffen, Paulding, OH (US)

(73) Assignee: Regal Beloit America, Inc., Beloit, WI (US)

( * ) Notice: Subject to any disclaimer, the term of this patent is extended or adjusted under 35 U.S.C. 154(b) by 444 days.

(21) Appl. No.: 12/844,021

(22) Filed: Jul. 27, 2010

(65) Prior Publication Data

US 2012/0026639 A1    Feb. 2, 2012

(51) Int. Cl.
H02H 3/22    (2006.01)

(52) U.S. Cl.
USPC .......................................... 361/118

(58) Field of Classification Search
None
See application file for complete search history.

(56) References Cited

U.S. PATENT DOCUMENTS

| | | | | |
|---|---|---|---|---|
| 4,455,586 A * | 6/1984 | McCartney | ...................... | 361/56 |
| 4,571,656 A * | 2/1986 | Ruckman | ........................ | 361/56 |
| 4,586,104 A * | 4/1986 | Standler | ........................ | 361/119 |
| 4,661,878 A * | 4/1987 | Brown et al. | ................... | 361/56 |
| 4,670,698 A * | 6/1987 | Fulton et al. | .................. | 318/802 |
| 4,698,721 A * | 10/1987 | Warren | ......................... | 361/110 |
| 4,725,739 A * | 2/1988 | McCartney et al. | ............. | 307/35 |
| 4,743,997 A * | 5/1988 | Carpenter, Jr. | ................. | 361/118 |
| 4,758,920 A * | 7/1988 | McCartney | .................... | 361/119 |
| 5,223,775 A | 6/1993 | Mongeau | | |
| 5,258,678 A | 11/1993 | Futami | | |
| 5,321,575 A | 6/1994 | Shilo | | |
| 5,444,341 A | 8/1995 | Kneifel, II et al. | | |
| 5,555,150 A | 9/1996 | Newman, Jr. | | |
| 5,592,058 A | 1/1997 | Archer et al. | | |
| 5,650,680 A | 7/1997 | Chula | | |
| 5,808,849 A * | 9/1998 | Storbeck | ........................ | 361/119 |
| 5,811,904 A | 9/1998 | Tajima et al. | | |
| 5,953,194 A * | 9/1999 | Atkins | ........................... | 361/119 |
| 6,034,460 A | 3/2000 | Tajima et al. | | |
| 6,188,157 B1 | 2/2001 | Tajima et al. | | |
| 6,208,054 B1 | 3/2001 | Tajima et al. | | |
| 6,226,166 B1 * | 5/2001 | Gumley et al. | ................ | 361/118 |
| 6,266,223 B1 * | 7/2001 | Curry | ............................. | 361/119 |
| 6,326,750 B1 | 12/2001 | Marcinkiewicz | | |
| 6,348,752 B1 | 2/2002 | Erdman et al. | | |
| 6,385,030 B1 * | 5/2002 | Beene | ........................... | 361/119 |
| 6,396,183 B1 | 5/2002 | Tajima et al. | | |
| 6,396,229 B1 | 5/2002 | Sakamoto et al. | | |
| 6,423,118 B1 | 7/2002 | Becerra et al. | | |
| 6,445,100 B2 | 9/2002 | Tajima et al. | | |
| 6,628,099 B2 | 9/2003 | Iwaji et al. | | |
| 6,650,081 B2 | 11/2003 | Iwaji et al. | | |
| 6,717,314 B2 | 4/2004 | Horst et al. | | |
| 6,734,592 B2 | 5/2004 | Tajima et al. | | |
| 6,794,784 B2 | 9/2004 | Takahashi et al. | | |

(Continued)

Primary Examiner — Stephen W Jackson
Assistant Examiner — Angela Brooks
(74) Attorney, Agent, or Firm — Armstrong Teasdale LLP

(57) ABSTRACT

Protection of a motor controller from a transient voltage is described. A method for protecting a motor controller from a transient voltage includes providing an electromagnetic interference (EMI) filter having at least a first input terminal, a second input terminal, a first output terminal, and a second output terminal, the EMI filter configured to suppress electromagnetic interference. The method also includes coupling a first voltage clamping device and a second voltage clamping device in series between the first output terminal and the second output terminal. The method also includes coupling a spark gap device to a ground conductor and to a shared node between the first voltage clamping device and the second voltage clamping device.

17 Claims, 3 Drawing Sheets

(56) References Cited

U.S. PATENT DOCUMENTS

| | | |
|---|---|---|
| 6,798,103 B2 | 9/2004 | Tajima et al. |
| 6,800,979 B2 | 10/2004 | Kato et al. |
| 6,822,360 B2 | 11/2004 | Tajima et al. |
| 6,876,117 B2 | 4/2005 | Tajima et al. |
| 6,949,856 B2 | 9/2005 | Tajima et al. |
| 7,119,470 B2 | 10/2006 | Tajima et al. |
| 7,183,686 B2 | 2/2007 | Sasaki et al. |
| 7,196,447 B2 | 3/2007 | Tajima et al. |
| 7,312,970 B2 | 12/2007 | Skinner |
| 7,342,379 B2 | 3/2008 | Marcinkiewicz |
| 7,378,773 B2 | 5/2008 | Tajima et al. |
| 7,626,349 B2 | 12/2009 | Marcinkiewicz et al. |
| 8,179,656 B2 * | 5/2012 | Jones et al. .................. 361/119 |
| 2003/0085221 A1 * | 5/2003 | Smolenski et al. ........... 219/501 |
| 2003/0090225 A1 * | 5/2003 | Posma et al. .................. 318/376 |
| 2004/0264086 A1 * | 12/2004 | Lin et al. ...................... 361/91.1 |
| 2005/0036262 A1 * | 2/2005 | Siebenthall et al. .......... 361/118 |
| 2005/0152085 A1 | 7/2005 | Skinner |
| 2005/0231880 A1 | 10/2005 | Sunaga et al. |
| 2005/0269972 A1 * | 12/2005 | Trestman et al. ............. 315/294 |
| 2009/0109587 A1 * | 4/2009 | Smith et al. .................... 361/86 |
| 2010/0214702 A1 * | 8/2010 | Zhao et al. ...................... 361/31 |
| 2012/0014144 A1 * | 1/2012 | Xu et al. ......................... 363/48 |
| 2012/0044599 A1 * | 2/2012 | Veskovic ........................ 361/18 |
| 2012/0249026 A1 * | 10/2012 | Wei et al. .................... 318/400.3 |

* cited by examiner

METHODS AND SYSTEMS FOR TRANSIENT VOLTAGE PROTECTION

BACKGROUND OF THE INVENTION

The field of the disclosure relates generally to protecting a motor control circuit from damage, and more specifically, to protecting a motor control circuit and connected electronics from transient and/or ringing voltages.

Electric motors are used in countless varieties and applications worldwide. For example, electric motors are included within heating, ventilation, and air conditioning (HVAC) applications. A typical HVAC application includes a thermostat, a furnace or a fan coil, a system controller, a motor controller, and at least one electric motor. For example, a typical HVAC application includes a condenser, which includes a condenser motor, and a compressor, which includes a compressor motor.

Since the motor controller is a component within a larger system, the motor controller may be subject to transient voltages caused by, for example, initiated operation or discontinued operation of another component within the HVAC application. Furthermore, the motor controller may be subject to transient voltages caused by events external to the HVAC application, for example, power surges. Power surges may be caused by different external forces, most typically, from lightning strikes. Moreover, typical clamping circuits may not protect the motor controller from a transient voltage. A typical clamping circuit is positioned between the power source and a common mode choke. Even when the clamping device clamps the voltage to below a predefined level, the common mode choke may amplify the clamped voltage and deliver it to the motor controller in a ringing wave mode.

BRIEF DESCRIPTION OF THE INVENTION

In one aspect, a method for protecting a motor controller from a transient voltage is provided. The method includes providing an electromagnetic interference (EMI) filter having at least a first input terminal, a second input terminal, a first output terminal, and a second output terminal, the EMI filter configured to suppress electromagnetic interference. The method also includes coupling a first voltage clamping device and a second voltage clamping device in series between the first output terminal and the second output terminal. The method also includes coupling a spark gap device to a ground conductor and to a shared node between the first voltage clamping device and the second voltage clamping device.

In another aspect, a protective device for conditioning electricity provided by a power line to a motor controller is provided. The power line includes at least a first alternating current (AC) line input and a second AC line input. The protective device includes an electromagnetic interference (EMI) filter for suppressing electromagnetic interference having at least a first input terminal, a second input terminal, a first output terminal, and a second output terminal, the first input terminal configured to be coupled to the first AC line input and the second input terminal configured to be coupled to the second AC line input. The protective device also includes a first voltage clamping device and a second voltage clamping device coupled in series between the first output terminal and the second output terminal of the EMI filter. The protective device also includes a spark gap device coupled between a ground conductor and a node shared by the first voltage clamping device and the second voltage clamping device.

In yet another aspect, a motor control system is provided. The motor control system includes a motor controller, an electric motor coupled to the motor controller and configured to receive an operating signal from the motor controller, and a power source coupled to the motor controller. The motor control system also includes a protective device coupled between the power source and the motor controller and configured to suppress transient voltages. The protective device includes an electromagnetic interference (EMI) filter having at least a first input terminal, a second input terminal, a first output terminal, and a second output terminal, the first input terminal and the second input terminal coupled to the power source. The protective device also includes a first voltage clamping device and a second voltage clamping device coupled in series between the first output terminal and the second output terminal of the EMI filter. The protective device also includes a spark gap device coupled between a ground conductor and a node shared by the first voltage clamping device and the second voltage clamping device.

DETAILED DESCRIPTION OF THE INVENTION

Figure 1:
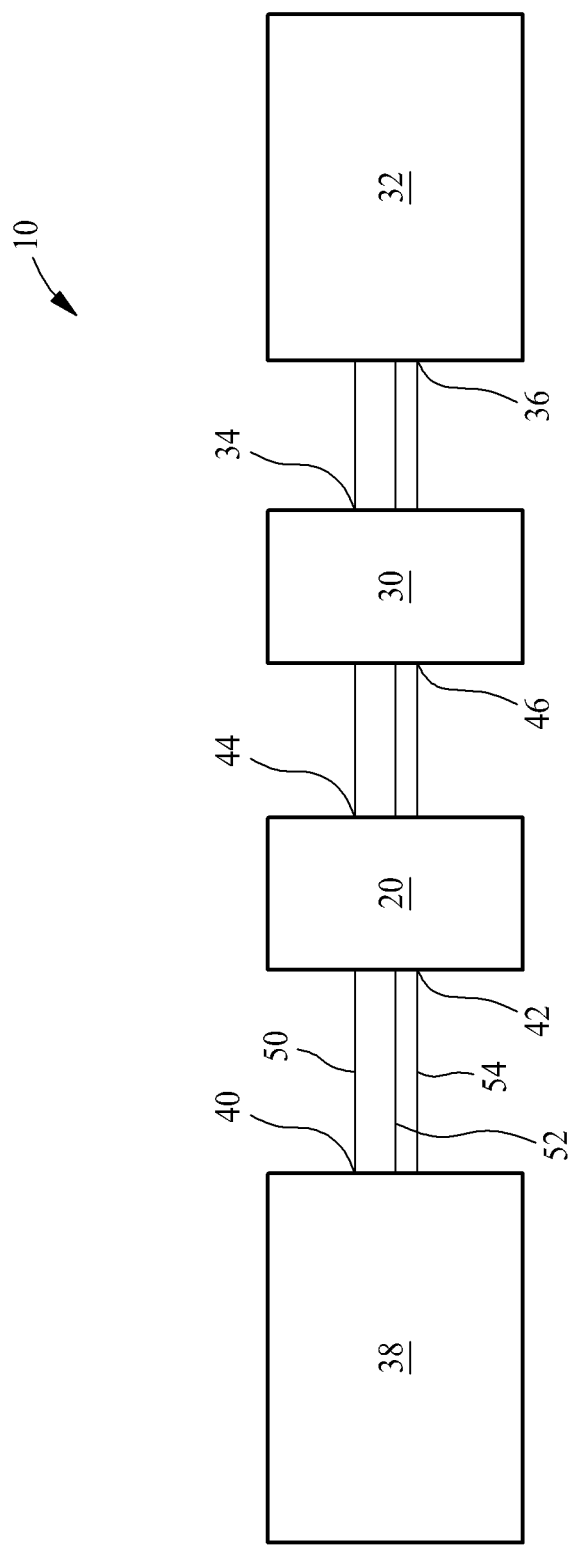
FIG. 1 is a block diagram of an exemplary motor control system that includes a protective circuit.

FIG. 1 is a block diagram of an exemplary embodiment of a motor control system 10 that includes a protective device 20. In the exemplary embodiment, motor control system 10 includes a motor controller 30 coupled to an electric motor 32. Although illustrated as separate components, motor controller 30 and electric motor 32 may be included within a single housing. Motor controller 30 provides electric motor 32 with operating signals, for example, but not limited to, sine wave operating signals, square wave operating signals, or any other suitable operating signals that allow system 10 to function as described herein. The operating signals direct operation of electric motor 32.

In the exemplary embodiment, motor control system 10 also includes a power source 38. In the exemplary embodiment, power source 38 is a one-hundred and twenty volt alternating current (AC) power supply, a two-hundred and forty volt AC power supply, or any other suitable power supply that allows system 10 to function as described herein. An output power line 40 of power source 38 is coupled to an input 42 of protective device 20 and an output 44 of protective device 20 is coupled to an input 46 of motor controller 30. In the exemplary embodiment, motor controller 30 converts the AC voltage from power source 38 to a direct current (DC) voltage used to drive electric motor 32. In the exemplary embodiment, output power line 40 includes three conductors: a line conductor 50, a neutral conductor 52, and a ground conductor 54. In some embodiments, line conductor 50 is referred to as L1 and neutral conductor 52 is referred to as L2. Ground conductor 54 is typically coupled to earth ground. However, ground conductor 54 may be coupled to a chassis ground or any other grounding that allows system 10 to function as described herein.

In the exemplary embodiment, protective device 20 is configured to suppress transient voltages and to prevent ringing voltages within system 10. A transient voltage, which may also be referred to as a voltage spike, may cause damage to components within system 10 if the transient voltage is greater than a maximum operating limit of the component. A transient voltage may be caused by, for example, but not limited to, switching of loads within system 10, switching of loads coupled to system 10, and/or lightning strikes. For example, when motor controller 30 and electric motor 32 are included within an HVAC system condenser, power source 38 may be subjected to voltage transients upon a changing state of another system within the HVAC system. Turning on a compressor may generate a voltage transient due to the large current initially drawn by the compressor. Such a voltage transient may damage motor controller 30 and/or electric motor 32 if it is not suppressed (i.e., reduced or eliminated) before reaching motor controller 30 and electric motor 32. Voltage transients may also prevent delivery of a stable output voltage. An unstable, oscillating voltage provided to motor controller 30 is referred to herein as a ringing voltage. Alternatively, a ringing voltage may include a sinusoidal voltage having an exponentially decreasing amplitude. A ringing voltage may also include an oscillating voltage with an increasing amplitude caused by resonance. Presence of a ringing voltage prevents proper operation of motor controller 30 and may also cause damage to motor controller 30 and/or electric motor 32.

Figure 2:
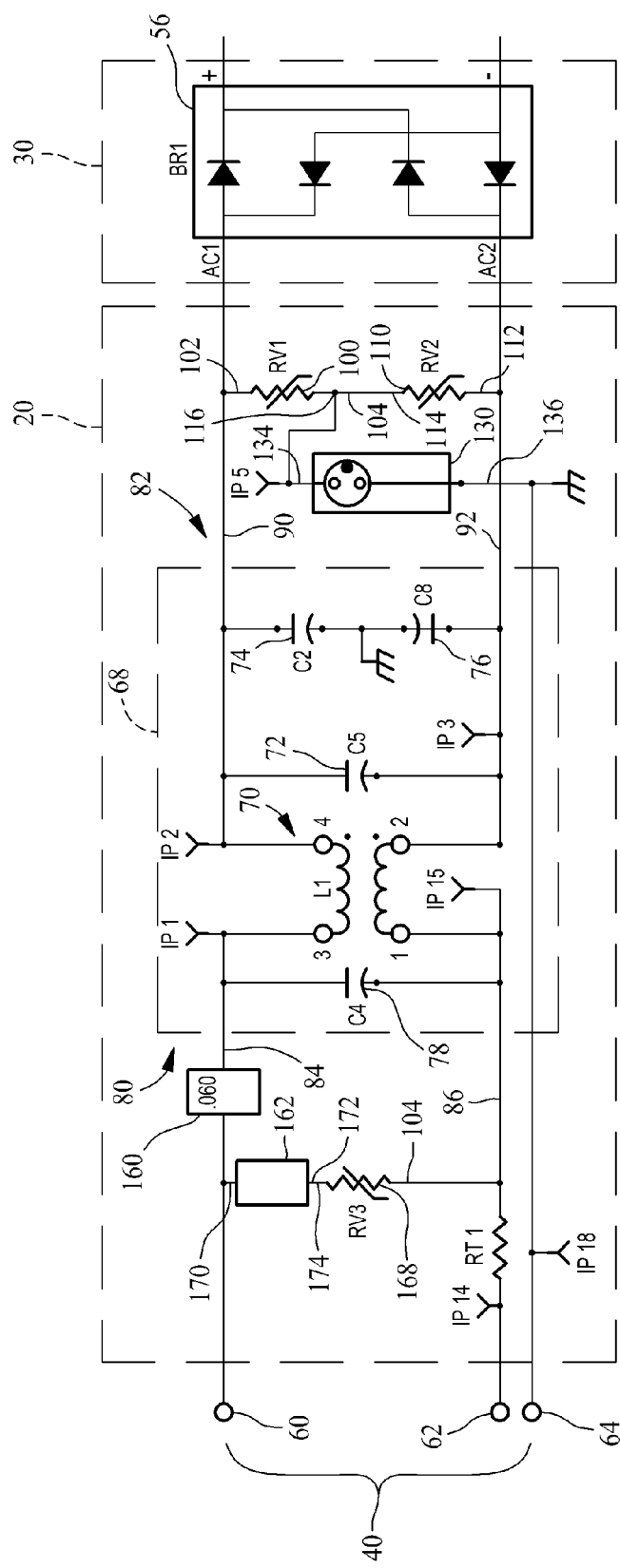
FIG. 2 is a circuit diagram of an exemplary embodiment of the protective circuit shown in FIG. 1.

FIG. 2 is a circuit diagram of an exemplary embodiment of protective device 20 (shown in FIG. 1). In the exemplary embodiment, protective device 20 is coupled to motor controller 30, which includes a rectifying circuit, for example, a bridge rectifier 56, for converting an AC power input to a DC power output. Although shown coupled to motor controller 30, protective device 20 may be used to protect any other suitable electrical device. Furthermore, in the exemplary embodiment, protective device 20 includes a printed circuit board (PCB) and components included within protective device 20 are coupled by conductive traces in or on the PCB. However, the components may be coupled using any conductors that allow protective device 20 to function as described herein. Moreover, protective device 20 may include a multi-layer PCB having multiple layers of conductive traces.

In the exemplary embodiment, protective device 20 includes a first AC line input terminal 60 for coupling protective device 20 to line conductor 50 (shown in FIG. 1). Protective device 20 also includes a second AC line input terminal 62 for coupling protective device 20 to neutral conductor 52 (shown in FIG. 1). Furthermore, protective device 20 includes a ground terminal 64 for coupling protective device 20 to ground conductor 54 (shown in FIG. 1). In some embodiments, second AC line input terminal 62 may also be referred to as neutral line input terminal 62. In the exemplary embodiment, protective device 20 conditions electricity provided by a power line, for example, power source 38 (shown in FIG. 1) to motor controller 30.

In the exemplary embodiment protective device 20 includes an electromagnetic interference (EMI) filter 68. Filter 68 may include, but is not limited to including, at least one common mode inductor 70, also referred to as a common mode choke, and a plurality of capacitors, for example, a first capacitor 72, a second capacitor 74, a third capacitor 76, and a fourth capacitor 78. Filter 68 is configured to suppress electromagnetic interference. Filter 68 includes a filter input 80 and a filter output 82. Filter 68 receives power output by power source 38 over output power line 40 (shown in FIG. 1). Filter input 80 includes a first input terminal 84 coupled to first AC line input terminal 60 and a second input terminal 86 coupled to second AC line input terminal 62. Filter output 82 includes a first output terminal 90 and a second output terminal 92.

In the exemplary embodiment, protective device 20 includes a first voltage clamping device 100 having a first end 102 and a second end 104. Protective device 20 also includes a second voltage clamping device 110 having a first end 112 and a second end 114. Voltage clamping devices 100 and/or 110 may include, but are not limited to, a metal oxide varistor (MOV), a Zener diode, a transient voltage suppression (TVS) diode, or any other voltage clamping device that allows protective device 20 to function as described herein. First voltage clamping device 100 couples first output terminal 90 of filter 68 to second end 114 of second voltage clamping device 110. Second voltage clamping device 110 couples second output terminal 92 of filter 68 to second end 104 of first voltage clamping device 100. In other words, first output terminal 90 and second output terminal 92 are coupled by first voltage clamping device 100 and second voltage clamping device 110. The coupling of first voltage clamping device 100 and second voltage clamping device 110 forms a common node 116. First and second voltage clamping devices 100 and 110 are configured to clamp a transient voltage between first output terminal 90 and second output terminal 92 that is above a typical operating voltage level for system 10 but below a rated maximum voltage level for first and second voltage clamping devices 100 and 110. For example, first voltage clamping device 100 may be rated for 500 volt operation and second voltage clamping device may be rated for 500 volt operation. In this example, first voltage clamping device 100 and second voltage clamping device 110 will clamp a transient voltage that is above 1000 volts to approximately 1000 volts. Therefore, motor controller 30 will not be exposed to the full transient voltage, but rather, will only be exposed to 1000 volts.

In the exemplary embodiment, protective device 20 further includes a spark gap device 130 that couples node 116 to ground terminal 64. For example, spark gap device 130 may include a gas discharge tube, at least two conductors separated a predetermined distance by air, or any other suitable voltage surge protection device that allows protective device 20 to function as described herein. In some embodiments, spark gap device 130 is configured to conduct at 3600 DC volts, +/−20% (e.g., 2880 VDC to 4320 VDC), and configured to protect motor controller 30 and/or motor 32 from open circuit voltages up to and exceeding 6000 VDC. The configuration of protective device 20, as well as the capacity of spark gap device 130, facilitates performing high potential testing on system 10 without damaging protective device 20 and without modifying protective device 20 to successfully complete the testing.

In the exemplary embodiment, first end 102 of first voltage clamping device 100 is coupled to first output terminal 90 of filter 68, second end 104 of first voltage clamping device 100 is coupled to a first end 134 of spark gap device 130, and a second end 136 of spark gap device 130 is coupled to ground terminal 64. Spark gap device 130, in combination with first voltage clamping device 100, is configured to suppress transient voltages between line conductor 50 and ground conductor 54. Suppressing transient voltages facilitates preventing damage to components coupled to protective device 20 caused by exposure to a transient voltage. For example, during typical operation of motor control system 10 (shown in FIG. 1), power source 38 supplies a 240 volt AC power to protective device 20. During typical operation, first voltage clamping device 100 has a high impedance, preventing current from flowing through first voltage clamping device 100. However, a voltage transient between line conductor 50 and ground conductor 54 causes the impedance of first voltage clamping device 100 to lower (e.g., causing a clamped voltage between line conductor 50 and spark gap device 130), which allows the transient current to flow through first voltage clamping device 100 to spark gap device 130. Spark gap device 130 also has a high impedance under normal operating voltages of motor control system 10. However, current may flow through spark gap device 130 upon application of a high voltage, for example, a transient voltage. In other words, a transient voltage causes first voltage clamping device 100 to shunt the current created by the high voltage to spark gap device 130, which shunts the current to ground terminal 64, thereby protecting components coupled to protective device 20 from the transient voltage.

As described above, protective device 20 also includes second voltage clamping device 110. In the exemplary embodiment, second voltage clamping device 110 is coupled between second output terminal 92 of filter 68 and first end 134 of spark gap device 130. More specifically, first end 112 of second voltage clamping device 110 is coupled to second output terminal 92 of filter 68, second end 114 of second voltage clamping device 110 is coupled to first end 134 of spark gap device 130, and second end 136 of spark gap device 130 is coupled to ground terminal 64. Spark gap device 130, in combination with second voltage clamping device 110, is configured to suppress transient voltages between neutral conductor 52 and ground conductor 54. For example, during typical operation, second voltage clamping device 110 has a high impedance, substantially similar to an open circuit, preventing current from flowing through second voltage clamping device 110. However, when a high voltage (e.g., a voltage transient between neutral conductor 52 and ground conductor 54) is present across second voltage clamping device 110, the impedance of second voltage clamping device 110 lowers (e.g., causing a clamped voltage between second output terminal 92 and spark gap device 130), which allows the transient current to flow through second voltage clamping device 110 to spark gap device 130. As described above, spark gap device 130 also has a high impedance under normal operating voltages of motor control system 10. However, current may flow through spark gap device 130 upon application of a high voltage, for example, a transient voltage. In other words, a transient voltage causes second voltage clamping device 110 to shunt the current created by the high voltage to spark gap device 130, which shunts the current to ground terminal 64, thereby protecting components coupled to protective device 20 from the transient voltage.

In the exemplary embodiment, protective device 20 may include a first intentional weak link 160. In an alternative embodiment, protective device 20 may also include a second intentional weak link 162. Protective device 20 may include one, or both, of intentional weak links 160 and 162. First intentional weak link 160 and second intentional weak link 162 may include, for example, a fuse, a circuit breaker, or a thinned-down trace on a PCB. In the exemplary embodiment, first intentional weak link 160 is coupled between first AC line input terminal 60 and first input terminal 84 of filter 68. First intentional weak link 160 is configured to open upon failure or malfunction of a component coupled to protective device 20, for example, failure of a component within bridge rectifier 56 of motor controller 30. First intentional weak link 160 provides a known area of weakness that will open as a result of a failure or malfunction of a component within system 10, preventing damage to other components of system 10. First intentional weak link 160 also provides a predictable failure point, which facilitates efficient troubleshooting of system 10.

In the alternative embodiment, second intentional weak link 162 is coupled in series with a third voltage clamping device 168, between first AC line input terminal 60 and second AC line input terminal 62. More specifically, a first end 170 of second intentional weak link 162 is coupled to first input terminal 84 of filter 68 and a second end 172 of second intentional weak link 162 is coupled to a first end 174 of third voltage clamping device 168. Third voltage clamping device 168 is configured to shunt a transient voltage that is above a typical operating voltage level for system 10 but below a rated maximum voltage level for third voltage clamping device 168, which protects common mode inductor 70 and other components within filter 68 from the transient voltage. Second intentional weak link 162 provides a known area of weakness that will open as a result of a failure or malfunction of a component within system 10, preventing damage to other components of system 10. A transient voltage above a rated maximum voltage level may damage third voltage clamping device 168. The failure mode of a voltage clamping device, for example, third voltage clamping device 168, is typically a low impedance state, which in protective device 20, prevents power from reaching filter 68, and therefore from reaching electric motor 32. Second intentional weak link 162 is configured to conduct electricity when third voltage clamping device 168 is functioning properly, therefore allowing third voltage clamping device 168 to function unimpeded. Second intentional weak link 162 is triggered to convert to an open circuit (i.e., not conduct electricity) when third voltage clamping device 168 is not functioning properly (i.e., remains in a low impedance state). Second intentional weak link 162 allows system 10 to function even if third voltage clamping device 168 fails.

Figure 3:
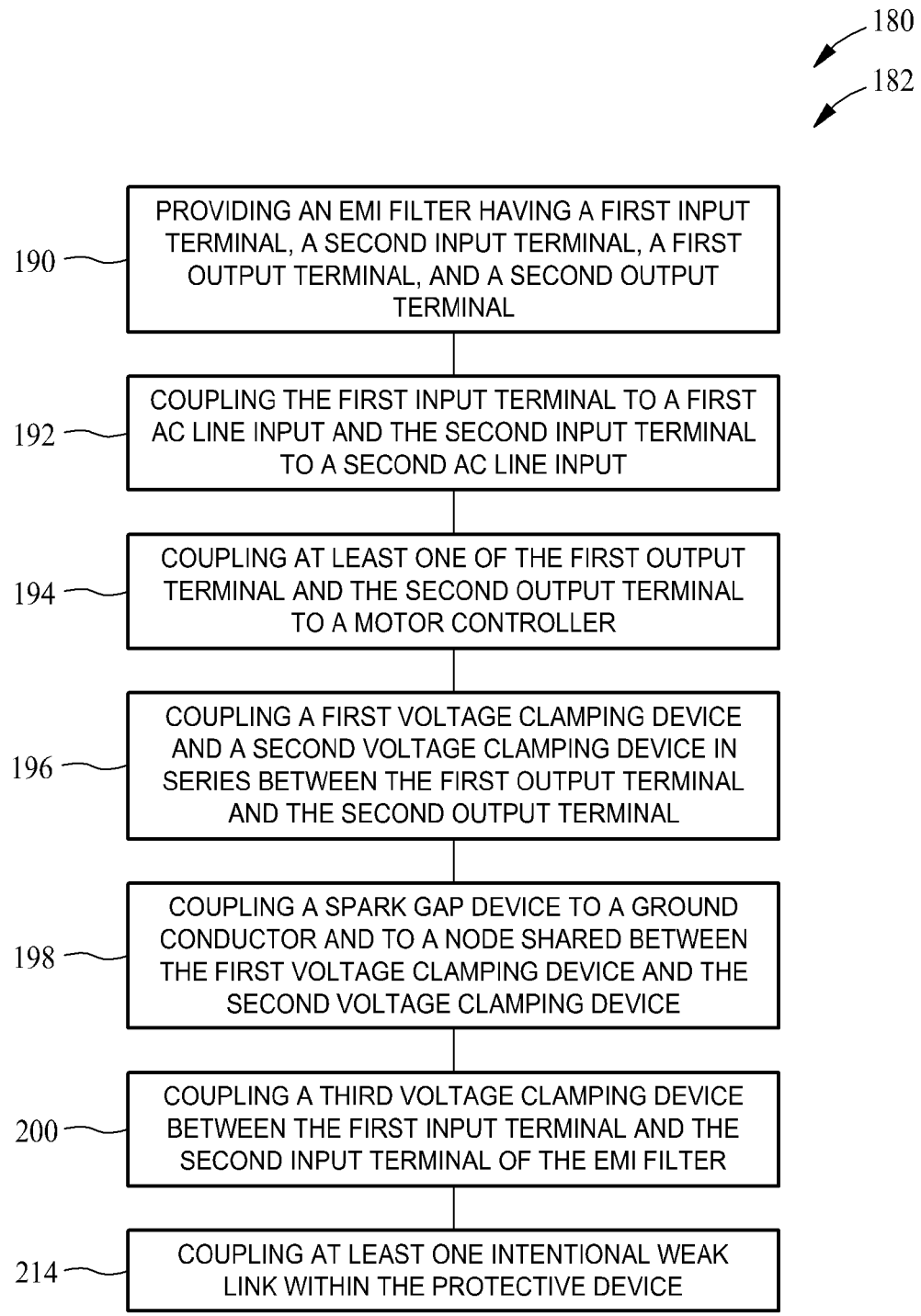
FIG. 3 is a flow diagram of an exemplary method for protecting a motor control circuit from a transient voltage.

FIG. 3 is a flow diagram 180 of an exemplary method 182 for protecting a motor controller, for example, motor controller 30 (shown in FIG. 1), from a transient voltage. In the exemplary embodiment, method 182 includes providing 190 an electromagnetic interference (EMI) filter, for example, filter 68 (shown in FIG. 2), having filter input 80 (shown in FIG. 2) and filter output 82 (shown in FIG. 2). Filter input 80 and filter output 82 may include, for example, first input terminal 84 (shown in FIG. 2), second input terminal 86 (shown in FIG. 2), first output terminal 90 (shown in FIG. 2), and second output terminal 92 (shown in FIG. 2). Method 182 includes coupling 192 first input terminal 84 of filter 68 to a first AC line input, for example, line conductor 50 (shown in FIG. 1) and second input terminal 86 (shown in FIG. 2) to a second AC line input, for example, neutral conductor 52 (shown in FIG. 1). Method 182 further includes coupling 194 at least one of first output terminal 90 and second output terminal 92 to a motor controller, for example, motor controller 30 (shown in FIG. 2).

In the exemplary embodiment, method 182 further includes coupling 196 a first voltage clamping device, for example, first voltage clamping device 100 (shown in FIG. 2) and a second voltage clamping device, for example, second voltage clamping device 110 (shown in FIG. 2) in series between first output terminal 90 and second output terminal 92 of EMI filter 68. First voltage clamping device 100 and second voltage clamping device 110 are configured to clamp a transient voltage between first output terminal 90 and second output terminal 92 to below a predefined voltage level which facilitates preventing the transient voltage from damaging components coupled to an output of protective device 20, for example, bridge rectifier 56 of motor controller 30.

In the exemplary embodiment, method 182 further includes coupling 198 a spark gap device, for example, spark gap device 130 (shown in FIG. 2) to a ground conductor, for example, ground terminal 64 (shown in FIG. 2), and to a shared node between first voltage clamping device 100 and second voltage clamping device 110, for example, node 116 (shown in FIG. 2). First voltage clamping device 100 and spark gap device 130 prevent damage to motor controller 30 caused by exposure to a transient voltage between first output terminal 90 and ground terminal 64. First voltage clamping device 100 and spark gap device 130 direct current caused by a transient voltage to ground. Second voltage clamping device 110 and spark gap device 130 prevent damage to motor controller 30 caused by exposure to a transient voltage between second output terminal 92 and ground terminal 64. Furthermore, first voltage clamping device 100 and second voltage clamping device 110 prevent damage to motor controller 30 caused by exposure to a transient voltage between first output terminal 90 and second output terminal 92 by clamping the voltage between a first input and a second input of motor controller 30 below a predefined voltage level. Moreover, coupling first voltage clamping device 100 and second voltage clamping device 110 in series between first output terminal 90 and second output terminal 92 of EMI filter 68, and coupling spark gap device 130 to ground terminal 64 and to node 116, suppresses transient voltages caused by voltage ringing generated within the EMI filter.

In the exemplary embodiment, method 182 further includes coupling 200 a third voltage clamping device, for example, third voltage clamping device 168 (shown in FIG. 2) between first input terminal 84 and second input terminal 86 of EMI filter 68. Third voltage clamping device 168 facilitates preventing damage to EMI filter 68 from transient voltages between line conductor 50 and neutral conductor 52.

Method 182 may also include coupling 214 at least one intentional weak link within protective device 20, for example, at least one of first intentional weak link 160 (shown in FIG. 2) and second intentional weak link 162 (shown in FIG. 2). Coupling 214 may include coupling first intentional weak link 160 between first input terminal 84 of filter 68 and first AC line input terminal 60. First intentional weak link 160 provides a known area of weakness that will open as a result of a failure or malfunction of a component within system 10, preventing damage to other components of system 10. First intentional weak link 160 also provides a predictable failure point, which facilitates efficient troubleshooting of system 10. Coupling 214 may also include, or in the alternative include, coupling second intentional weak link 162 and third voltage clamping device 168 in series between first input terminal 84 and second input terminal 86 of EMI filter 68. Second intentional weak link 162 allows system 10 to function even if third voltage clamping device 168 fails.

Described herein are exemplary methods and systems for suppressing transient voltages and providing conditioned power to a device. More specifically, the methods and systems described herein facilitate protecting a motor controller and electric motor from damage that may be caused by a transient voltage. Furthermore, voltage ringing that may be generated by the EMI filter is suppressed by positioning at least one voltage clamping device between the EMI filter and the motor controller. By positioning at least one voltage clamping device on an output side of the EMI filter, components are protected from high voltages that may be generated by the EMI filter (for example, due to ringing of the EMI filter). Furthermore, positioning at least one voltage clamping device on an input side of the EMI filter provides transient voltage protection to the EMI filter and components coupled to the EMI filter. The methods and systems described herein provide multiple levels of protection such that a failure within an input-side voltage clamping device within the protective device will not prevent operation of the motor control system.

The methods and systems described herein facilitate efficient and economical transient voltage protection to a motor controller. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for protecting a motor controller from a transient voltage, said method comprising:
providing an electromagnetic interference (EMI) filter having at least a first input terminal, a second input terminal, a first output terminal, and a second output terminal, the EMI filter configured to suppress electromagnetic interference;
coupling a first voltage clamping device and a second voltage clamping device in series between the first output terminal and the second output terminal;
coupling a spark gap device to a ground conductor and to a shared node between the first voltage clamping device and the second voltage clamping device; and
coupling a third voltage clamping device between the first input terminal and the second input terminal of the EMI filter.

2. A method in accordance with claim 1 further comprising configuring the first output terminal for coupling to a first input of a motor controller and configuring the second output terminal for coupling to a second input of the motor controller.

3. A method in accordance with claim 2 further comprising:
configuring the first voltage clamping device and the spark gap device to prevent damage to the motor controller caused by exposure to a transient voltage between the first output terminal and the ground conductor; and
configuring the second voltage clamping device and the spark gap device to prevent damage to the motor controller caused by exposure to a transient voltage between the second output terminal and the ground conductor.

4. A method in accordance with claim 2 further comprising configuring the first voltage clamping device and the second voltage clamping device to prevent damage to the motor controller caused by exposure to a transient voltage between the first output terminal and the second output terminal by clamping the voltage between the first input and the second input of the motor controller below a predefined voltage level.

5. A method in accordance with claim 1, wherein coupling the first voltage clamping device and the second voltage clamping device in series between the first output terminal and the second output terminal of the EMI filter, and coupling the spark gap device to a ground conductor and to the shared node between the first voltage clamping device and the second voltage clamping device, suppresses voltage ringing generated within the EMI filter.

6. A method in accordance with claim 1, further comprising at least one of:
configuring the first input terminal of the EMI filter for coupling to a first alternating current (AC) line input;
configuring the second input terminal of the EMI filter for coupling to a second AC line input;
coupling a first intentional weak link between the first input terminal of the EMI filter and the first AC line input; and
coupling a second intentional weak link and the third voltage clamping device in series between the first input terminal and the second input terminal of the EMI filter.

7. A protective device for conditioning electricity provided by a power line to a motor controller, the power line comprising at least a first alternating current (AC) line input and a second AC line input, said protective device comprising:
an electromagnetic interference (EMI) filter for suppressing electromagnetic interference having at least a first input terminal, a second input terminal, a first output terminal, and a second output terminal, the first input terminal configured to be coupled to the first AC line input and the second input terminal configured to be coupled to the second AC line input;
a first voltage clamping device and a second voltage clamping device coupled in series between the first output terminal and the second output terminal of the EMI filter;
a spark gap device coupled between a ground conductor and a node shared by the first voltage clamping device and the second voltage clamping device; and
a third voltage clamping device coupled between the first input terminal and the second input terminal of the EMI filter, the third voltage clamping device configured to protect the EMI filter from a transient voltage between the first AC line input and the second AC line input.

8. A device in accordance with claim 7, wherein the spark gap device, in combination with the first voltage clamping device, is configured to prevent damage to a device coupled to the EMI filter caused by exposure to a transient voltage between the first output terminal and the ground conductor.

9. A device in accordance with claim 7, wherein the spark gap device, in combination with the second voltage clamping device, is configured to prevent damage to a device coupled to the EMI filter caused by exposure to a transient voltage between the second output terminal and the ground conductor.

10. A device in accordance with claim 7, further comprising an intentional weak link coupled between the first input terminal and the third voltage clamping device, the intentional weak link configured to uncouple the third voltage clamping device from the first input terminal if the third voltage clamping device is damaged.

11. A device in accordance with claim 7, wherein the first voltage clamping device, the second voltage clamping device, and the spark gap device are configured to suppress an open circuit transient voltage of at least 6000 volts.

12. A motor control system comprising:
a motor controller;
an electric motor coupled to the motor controller and configured to receive an operating signal from the motor controller;
a power source coupled to the motor controller; and
a protective device coupled between the power source and the motor controller and configured to suppress transient voltages, the protective device comprising:
an electromagnetic interference (EMI) filter having at least a first input terminal, a second input terminal, a first output terminal, and a second output terminal, the first input terminal and the second input terminal coupled to the power source;
a first voltage clamping device and a second voltage clamping device coupled in series between the first output terminal and the second output terminal of the EMI filter;
a spark gap device coupled between a ground conductor and a node shared by the first voltage clamping device and the second voltage clamping device; and
a third voltage clamping device coupled between the first input terminal and the second input terminal of the EMI filter, the third voltage clamping device configured to protect the EMI filter from a transient voltage.

13. A system in accordance with claim 12, wherein the spark gap device, in combination with the first voltage clamping device, is configured to direct current caused by a transient voltage between the first output terminal of the EMI filter and the ground conductor to ground.

14. A system in accordance with claim 12, wherein the spark gap device, in combination with the second voltage clamping device, is configured to direct current caused by a transient voltage between the second output terminal of the EMI filter and the ground conductor to ground.

15. A system in accordance with claim 12, wherein the protective device further comprises at least one intentional weak link, the at least one intentional weak link coupling an AC line input of the power source to at least one of the third voltage clamping device and the first input terminal of the EMI filter.

16. A system in accordance with claim 15, wherein the at least one intentional weak link is configured to at least one of:
uncouple the third voltage clamping device from the first input terminal if the third voltage clamping device is damaged; and
uncouple the first AC line input from the first input terminal of the EMI filter when a component coupled to at least one of the first output terminal and the second output terminal of the EMI filter is damaged.

17. A system in accordance with claim 12, wherein the first voltage clamping device, the second voltage clamping device, and the spark gap device are configured to suppress an open circuit transient voltage of at least 6000 volts.

* * * * *